United States Patent
Lynch et al.

(10) Patent No.: US 8,416,125 B1
(45) Date of Patent: Apr. 9, 2013

(54) RADIATIVE NOISE ADDING COMPENSATION FOR MMW SENSOR ARRAYS

(75) Inventors: Jonathan J. Lynch, Oxnard, CA (US); Robert G. Nagele, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 612 days.

(21) Appl. No.: 12/611,345

(22) Filed: Nov. 3, 2009

(51) Int. Cl.
G01S 13/89 (2006.01)
G01S 7/40 (2006.01)

(52) U.S. Cl. .................................. 342/168; 342/179

(58) Field of Classification Search ............. 342/168
See application file for complete search history.

(56) References Cited

U.S. PATENT DOCUMENTS

| | | | | |
|---|---|---|---|---|
| 3,631,346 A | * | 12/1971 | Riggs ......................... | 324/76.14 |
| 3,740,748 A | * | 6/1973 | Hose ........................... | 342/194 |
| 3,921,169 A | * | 11/1975 | Lazarchik et al. ............. | 342/87 |
| 4,235,107 A | * | 11/1980 | Ludeke et al. ................ | 374/122 |
| 4,292,638 A | * | 9/1981 | Lazarchik et al. ............. | 342/88 |
| 5,202,692 A | * | 4/1993 | Huguenin et al. ............. | 342/179 |
| 5,471,047 A | * | 11/1995 | Even-Sturlesi et al. .... | 250/208.1 |
| 5,688,050 A | * | 11/1997 | Sterzer et al. ................. | 374/122 |
| 5,760,397 A | * | 6/1998 | Huguenin et al. ............ | 250/332 |
| 6,242,740 B1 | * | 6/2001 | Luukanen et al. ............ | 250/353 |
| 6,844,786 B2 | * | 1/2005 | Pan et al. ...................... | 331/78 |
| 6,853,452 B1 | | 2/2005 | Laufer | |
| 7,239,122 B2 | * | 7/2007 | Ammar ........................ | 324/76.14 |
| 8,003,928 B1 | * | 8/2011 | Lynch ........................... | 250/208.1 |
| 2006/0273255 A1 | | 12/2006 | Volkov et al. | |
| 2009/0020687 A1 | | 1/2009 | Lehmann et al. | |
| 2011/0298680 A1 | * | 12/2011 | Shylo et al. .................. | 343/762 |

FOREIGN PATENT DOCUMENTS

GB 2098819 * 11/1982

OTHER PUBLICATIONS

Batelaan, et al., "Improved Noise-Adding Radiometer for Microwave Receivers," NASA Tech Brief, B73-10345, Aug. 1973.
Janssen, A., et al., "Direct Images of the CMB From Space," Astrophysical Journal, 1996, pp. 15.
Kraus, J.D., et al., "Radio Astronomy," Ch. Radio—Telescope Receivers, Mcgraw Hill, NY, pp. 289-290, 1966.
Stelzreid, "Noise Adding Radiometer Performance Analysis," TDA Progress Report 42-59, JPL, pp. 98-106, Jul. and Aug. 1980.
Tiuri, "Radio Astronomy Receivers," IEEE Trans. on Antennas and Propagation, pp. 930-938, Dec. 1964.
Ulaby, et al., "Microwave Remote Sensing," vol. 1, Artech House, MA, section 6-9, pp. 369-374, 1981.
Ulaby, et al., "Microwave Remote Sensing," vol. 1, Artech House, MA, section 6-12, pp. 391-392, 1981.
U.S. Appl. No. 12/336,378, filed Dec. 16, 2008, Lynch.

* cited by examiner

Primary Examiner — John B Sotomayor
Assistant Examiner — Matthew M Barker
(74) Attorney, Agent, or Firm — Ladas & Parry

(57) ABSTRACT

An imaging array for sensing scene energy includes a plurality of sensors, a radiative noise source for radiating noise energy, a modulator for turning the radiative noise source on and off, and a coupling device for combining a first portion of the scene energy and a second portion of the noise energy to form a combined scene and noise energy for sensing by the plurality of sensors.

20 Claims, 9 Drawing Sheets

INTEGRATING AN OUTPUT FOR AT LEAST ONE OF THE    212
PLURALITY OF SENSORS FOR A PERIOD OF TIME DURING
WHICH THE NOISE SOURCE IS TURNED OFF FOR A SET OF
NOISE SOURCE OFF PERIODS TO FORM A SET OF
INTEGRATED OFF OUTPUTS

INTEGRATING THE OUTPUT FOR A PERIOD OF TIME
DURING WHICH THE NOISE SOURCE IS TURNED ON FOR A
SET OF NOISE SOURCE ON PERIODS TO FORM A SET OF   214
INTEGRATED ON OUTPUTS

AVERAGING THE SET OF INTEGRATED OFF OUTPUTS TO
FORM AN AVERAGE OFF OUTPUT                        216

AVERAGING THE SET OF INTEGRATED ON OUTPUTS TO
FORM AN AVERAGE ON OUTPUT                         218

DIVIDING THE AVERAGE OFF OUTPUT BY THE AVERAGE ON
OUTPUT MINUS THE AVERAGE OFF OUTPUT               220

FIG. 8B

RADIATIVE NOISE ADDING COMPENSATION FOR MMW SENSOR ARRAYS

TECHNICAL FIELD

This disclosure relates to methods for compensating drift and 1/f noise in imaging arrays and in particular for millimeter wave imaging arrays.

BACKGROUND

Imaging arrays have sensitivities that are limited by drift and 1/f noise. FIG. 1 shows a graph for a typical 1/f noise spectrum. The 1/f noise has a frequency spectrum (noise vs. frequency (f)) that generally follows a 1/f curve 11 and hence the name for 1/f noise. Above a knee frequency 15 the noise is generally white noise. The cause of 1/f noise is related to properties inherent in semiconductors, which are used in many applications including imaging arrays. The noise at frequencies below the knee frequency 15 causes the imaging array's output to drift in time. Therefore, it cannot be determined whether the output of a sensor in an imaging array is changing because the scene is changing or whether the output change is due to 1/f noise and drift, unless some step is taken to compensate or calibrate out the drift.

There are currently many methods of calibrating the drift, and these methods can be broken down into two categories: one that applies only to mechanically scanned arrays and one that applies to scanning or staring (non-scanning) arrays.

In mechanically scanned arrays the sensors are moved to scan an image. For example, a mechanically scanned array can be a line array of sensors. Mechanically scanning the imaging elements modulates the signals by creating a time varying element output as the element scans across a scene. This modulation shifts the image signal to a higher frequency and effectively separates the signal from the 1/f noise in frequencies below the knee frequency. One can subtract the average value of the signal across the entire scan from the scan signal and limit the drift to what occurs within that scan as disclosed by M. A. Janssen, D. Scott, M. White, M. D. Seiffert, C. R. Lawrence, K. M. Gorski, M. Dragovan, T. Gaier, K. Ganga, S. Gulkis, A. E. Lange, S. M. Levin, P. M. Lubin, P. Meinhold, A. C. S. Readhead, P. L. Richards, J. E. Ruhl, "Direct images of the CMB from space," Astrophysical journal, 1996, pp. 15. This method has the advantage of not requiring any additional hardware; however, appreciable drift can still occur within the scan period. To ensure minimal impact of drift on the sensor performance, the image must be scanned at a rate at least four times the knee frequency, which modulates the image signal to be within the white noise spectrum of the 1/f noise. Because typical commercial sensors have knee frequencies of 1 KHz or more, this method cannot be effectively applied due to the high scan rates required.

The methods used to calibrate staring arrays do not depend on movement of the sensor elements; however, these methods can also be applied to scanned arrays if desired. One method uses a switch, called a Dicke switch, to modulate the image signal, as disclosed in Ulaby, Microwave Remote Sensing, Vol 1, Artech House, MA, 1981, section 6-9. Another method of modulating the image signal is to use a rotating optical blade, which is called an optical chopper, in front of the sensors. The Dicke switch and the optical chopper both modulate the input signal to move the image signal spectral energy away from the low frequency noise, thereby minimizing drift effects.

The Dicke switch must be installed in each element separately, and therefore adds significant cost to the array. Furthermore, the Dicke switch introduces losses that degrade the sensitivity of the array.

An optical chopper has the advantage of modulating all of the elements at once because it can be placed in front of all the sensors. The drawback of optical choppers is that they cannot spin at high enough rates to modulate the image signal above typical knee frequencies. In addition, optical choppers often create audible noise and also require significant space when used with large arrays. Because an optical chopper is a moving part, more maintenance is required.

Another method of drift compensation is called noise injection. In this scheme each sensor contains a noise source that is coupled into each sensor input. The noise source is switched on and off at a rate higher than the knee frequency. By taking the ratio of the output of the sensor during the on and off times, one can eliminate the output drift due to temporal gain fluctuations. This method is disclosed in Ulaby, Microwave Remote Sensing, Vol 1, Artech House, MA, 1981, section 6-12. John D. Kraus, in Radio-Telescope Receivers, McGraw Hill, N.Y., 1966, pages 289-290 discusses the same method for a radio telescope receiver. This method requires additional hardware to be designed into each of the sensors, adding significant cost. Furthermore, the ability to calibrate out drift is limited to the inherent stability of the noise source. Noise sources contain uncontrolled amplitude fluctuations, typically with a 1/f type of noise spectrum, and these fluctuations add additional drift to the output that cannot be compensated using the noise injection method disclosed by Ulaby and Kraus.

What is needed is a method for compensating out 1/f noise and drift for an arbitrarily sized array of sensors, whether the sensors are mechanically scanned or staring. Also needed is an imaging array which can be compensated for drift while adding only a small cost to the imaging array. The embodiments of the present disclosure answer these and other needs.

SUMMARY

In a first embodiment disclosed herein, an imaging array for sensing scene energy comprises a plurality of sensors, a radiative noise source for radiating noise energy, a modulator for turning the radiative noise source on and off, and a coupling device for combining a first portion of the scene energy and a second portion of the noise energy to form a combined scene and noise energy for sensing by the plurality of sensors.

In another embodiment disclosed herein, a method for compensating an imaging array for sensing scene energy comprises modulating a noise source to turn on and off, radiating noise energy from the noise source, combining a first portion of the scene energy and a second portion of the noise energy to form a combined scene and noise energy, and sensing the combined scene and noise energy with a plurality of sensors.

An aspect of the method comprises integrating an output for at least one of the plurality of sensors for a period of time during which the noise source is turned off for a set of noise source off periods to form a set of integrated off outputs, integrating the output for a period of time during which the noise source is turned on for a set of noise source on periods to form a set of integrated on outputs, averaging the set of integrated off outputs to form an average off output, averaging the set of integrated on outputs to form an average on output, and dividing the average off output by the average on output minus the average off output.

These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

FIGS. 8A and 8B are flow diagrams of a method in accordance with the present disclosure.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Figure 2:
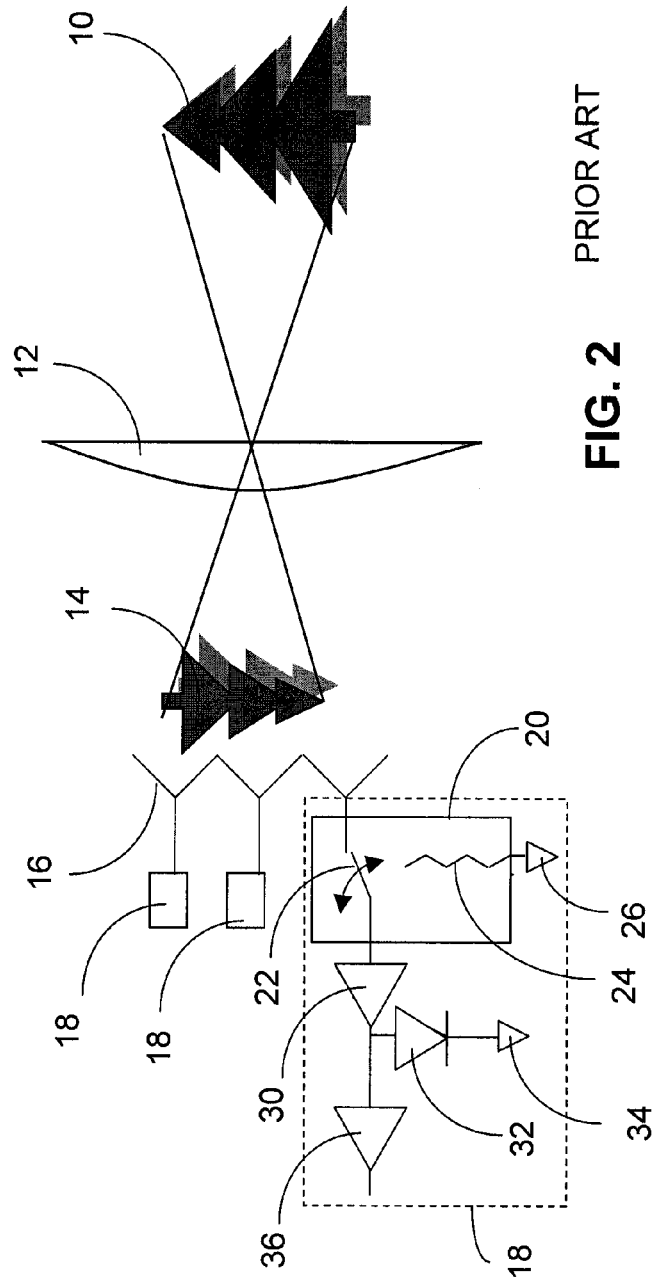
FIG. 2 shows a typical imaging array with a Dicke switch in accordance with the prior art.

Referring to FIG. 2, a typical imaging array with a Dicke switch to compensate for the 1/f noise and drift is shown in accordance with the prior art. The image 10 is generally focused by a lens 12 to focus the image 14 onto a sensor array. For a millimeter wave imaging array, each sensor in the array has an antenna 16 and a millimeter wave receiver 18. A receiver 18 typically has a Dicke switch 20, a low noise amplifier 30, a detector 32 and a video amplifier 36. The detector 32 is tied to a ground 34. The purpose of the detector is to provide an output signal (voltage or current) that is proportional to the RF noise power collected from the scene. As discussed above, the Dicke switch 20 modulates the image signal 14 by switching switch 22. This switches the input to the low noise amplifier 30 between the antenna 16 and the reference, which in this case is a resistor 24 to ground 26. If the switching is fast enough, then the image signal is modulated above the knee frequency of the 1/f noise. The modulated output of the sensor is synchronously detected to provide an output proportional to the difference between the scene temperature and the reference temperature. A key drawback of this method is that the Dicke switch 20 must be installed in each receiver 18, and therefore adds significant cost to the sensor array. Furthermore, the Dicke switch 20 introduces losses that degrade the sensitivity of the array.

In the above discussion, the receiver is described as having an LNA and a detector; however, it will be understood by one skilled in the art there are millimeter wave receivers that contain mixers, phase switches, baluns, and so on.

Figure 3:
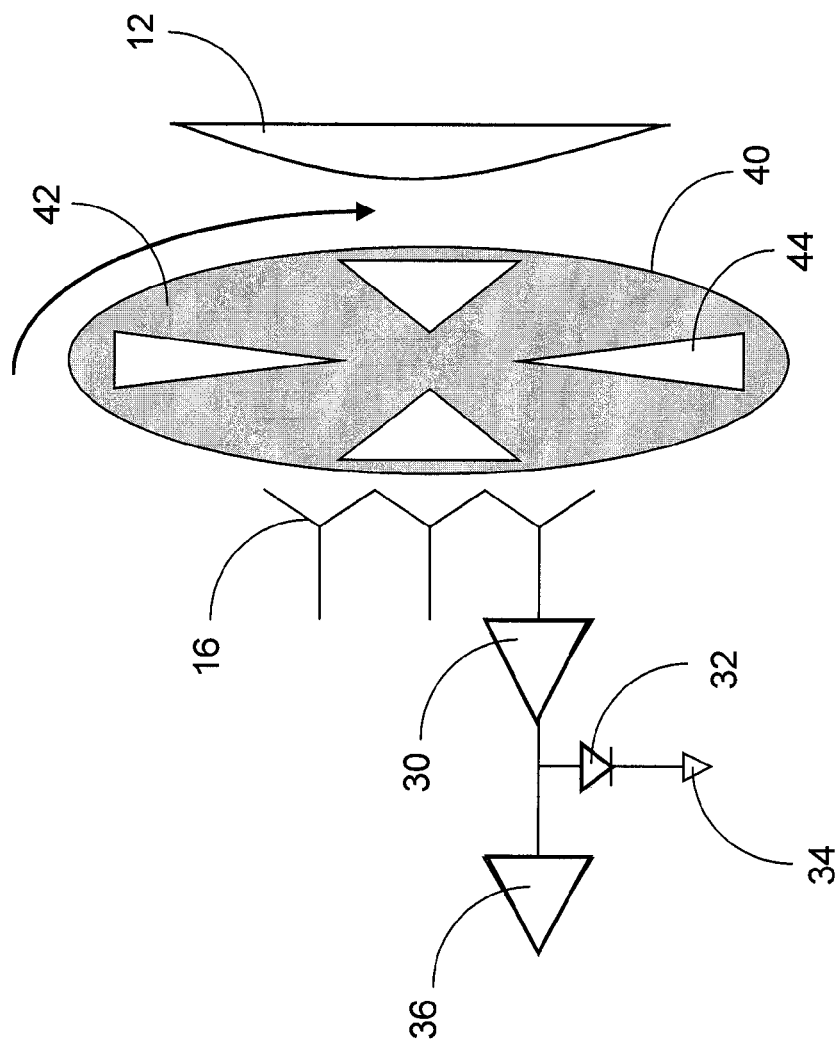
FIG. 3 is a typical imaging array using an optical chopper in accordance with the prior art.

FIG. 3 shows a typical millimeter wave imaging array using an optical chopper in accordance with the prior art. The image focused by lens 12 passes through a rotating optical chopper 40 that has opaque areas 42 and open areas 44. The rotation of the opaque and open areas causes modulation of the image signal, which shifts the image signal spectrum up in frequency. The image signal then is received by the antennas 16 and the receivers, each of which include a low noise amplifier 30, detector 32 and video amplifier 36. The modulated output of the sensor is synchronously detected to provide an output proportional to the difference between the scene temperature and the reference temperature. The optical chopper 40 has the advantage of modulating all of the elements at once because it can be placed in front of all the input antennas 16. The disadvantage is that an optical chopper cannot spin at high enough rates to compensate for typical knee frequencies. In addition, optical choppers often create audible noise and require significant packaging volume. Another disadvantage is that the optical chopper is a moving part that can wear out over time and require maintenance.

Figure 4:
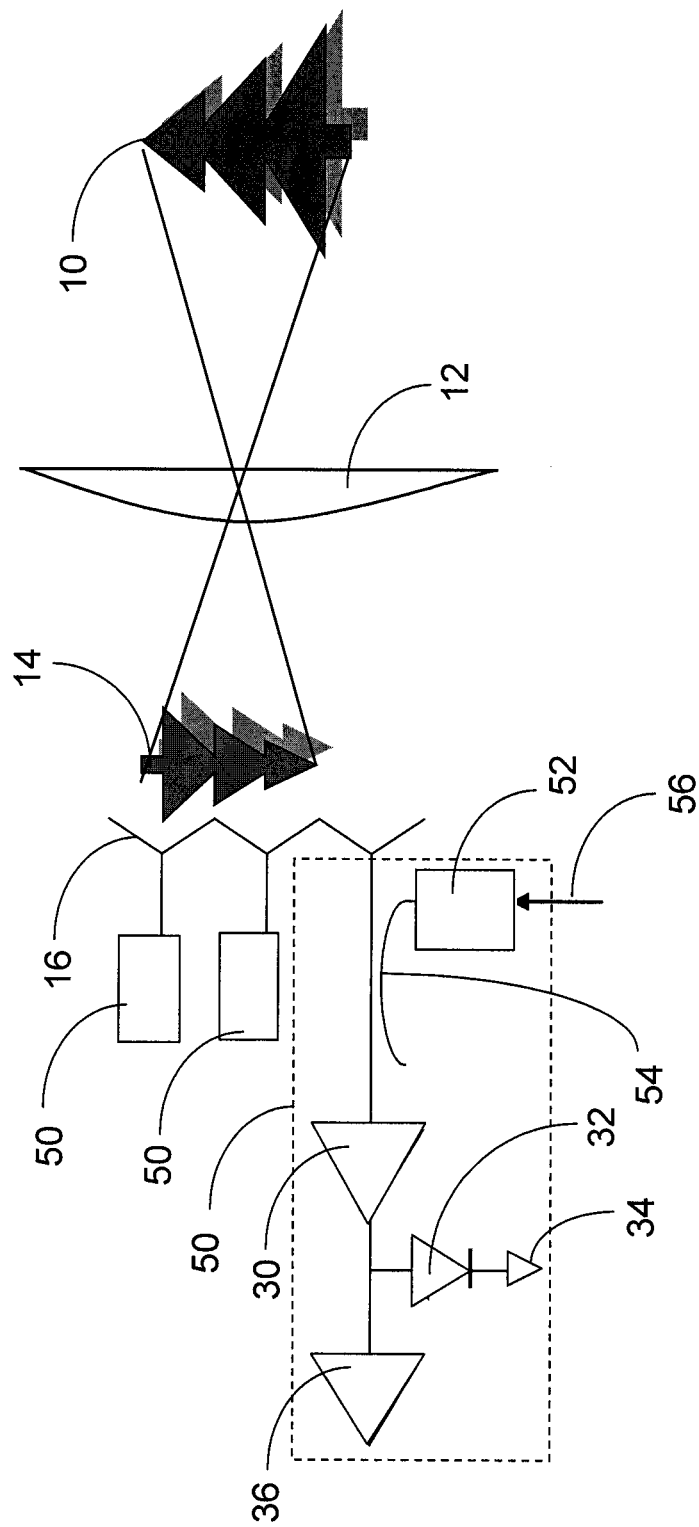
FIG. 4 is typical imaging array using a noise injection method in accordance with the prior art.

FIG. 4 shows a typical imaging array using a noise injection method in accordance with the prior art. In this method each receiver 50 has a noise source 52 that is coupled into the input to low noise amplifier 30 via a directional coupler 54. The noise source 52 is switched on and off at a rate higher than the knee frequency to modulate the image signal to shift the image signal above the knee frequency.

The noise injection method of FIG. 4 requires the noise source 52 to be added into each of the receivers 50, adding significant cost.

Figure 5:
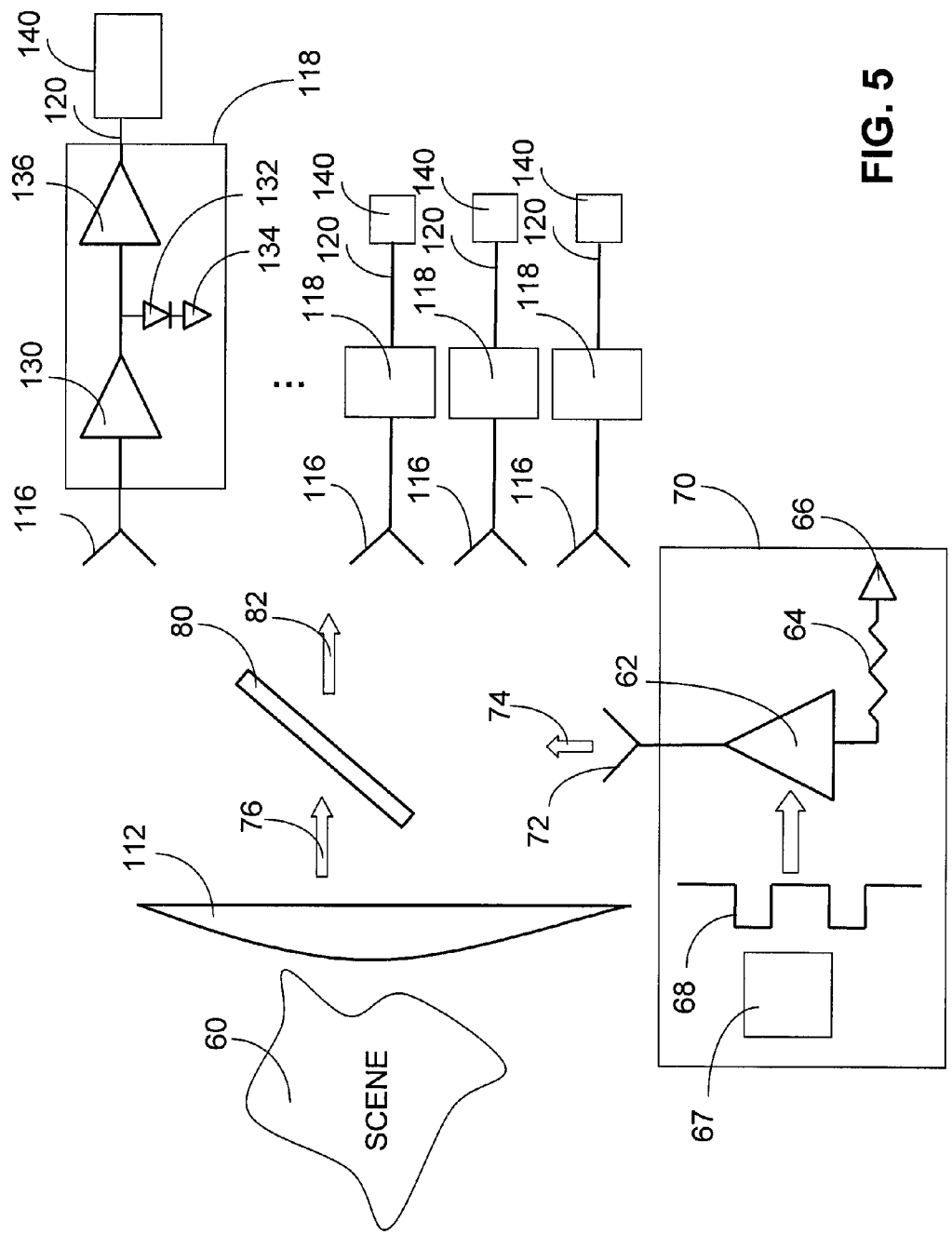
FIG. 5 is an imaging array with compensation in accordance with the present disclosure.

Referring now to FIG. 5, an imaging array is shown in accordance with the present disclosure. The imaging array may be a millimeter wave imaging array that generally operates in the W band, which is approximately from 75 GHz to 110 GHz. A millimeter wave imaging array senses the thermal energy from an image, and as discussed above, calibration or compensation is necessary to distinguish real temperature changes in the image from drift caused by the 1/f noise. The methods described herein may be effectively used for frequency bands other than the millimeter wave band.

In FIG. 5, the energy from scene 60 is focused by lens 12 to produce focused scene energy 76. Concurrently, a radiative noise source 70 is modulated by control waveform 68 to turn on and off. The resulting modulated noise energy 74 is radiated from antenna 72 to a coupling device 80 that adds a fraction of the noise energy 74 to the scene energy 76, so that energy 82 sent to the sensor array of antennas 116 and receivers 118 contains energy from both the scene energy 76 and the modulated noise energy 74. The coupling device 80 may be a partial reflector 80. The partial reflector 80 transmits most of the scene energy 76 to the sensor array of antennas 116 and receivers 118, while reflecting some of the scene energy 76 and reflects a fraction of the noise energy 74 to the antennas 116 and receivers 118, while allowing the rest of the noise energy 74 to pass through.

The noise source 70 may have an amplifier 62 with an input having a resistor 64 tied to ground 66. The amplifier 62 is turned on and off by modulation signal 68 from a modulator 67. The amplifier 62 may be an RF amplifier with its input terminated to ground 66. The noise source may be turned on and off by the modulator 67 turning the drain supply for the RF amplifier on and off.

The noise source 70 may output noise energy 74 that is essentially white noise or the noise energy 74 may be deterministic and consist of a single frequency or a range of frequencies. The noise source should be stable over time and more stable over time than the imaging array including antenna 116 and receiver 118. According to the present disclosure "stable" means the noise energy power fluctuations in time are small.

The sensor array, which may be a millimeter wave imaging array, has an array of antennas 116 each of which is connected to a respective receiver 118. Each receiver may have a low noise amplifier 130, a detector 132, which can be a diode 132 connected to ground 134, and a video amplifier 136. Each receiver 118 has an output 120.

Figure 6C:
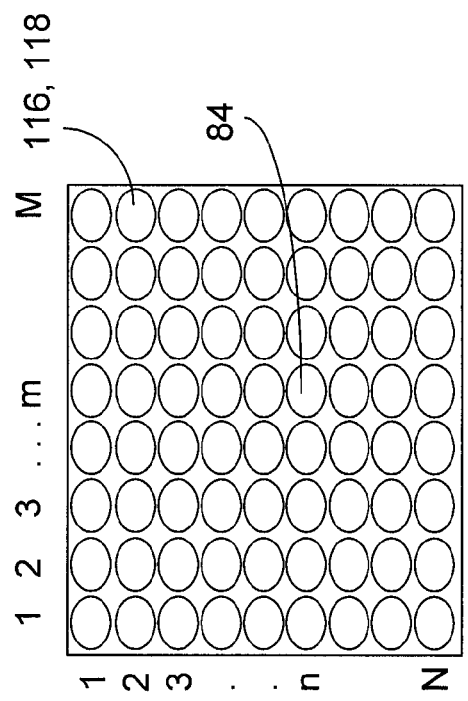
FIGS. 6A-6C are views of one dimensional vertical and horizontal imaging arrays, and a two dimensional imaging array, respectively, in accordance with the present disclosure.
Figure 6B:
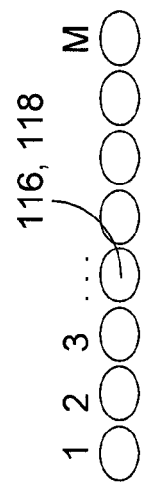
Figure 6A:
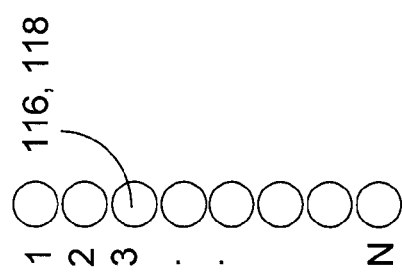

FIGS. 6A-6C are views of one dimensional vertical (FIG. 6A) and horizontal imaging arrays (FIG. 6B), and a two dimensional imaging array (FIG. 6C) of antennas 116 and receivers 118, respectively, in accordance with the present disclosure. The one dimensional arrays may be used in scanning image sensors and the two dimensional array may be used in a staring image sensor.

As discussed above, the partial reflector 80 adds a fraction of the noise energy 74 from noise source 70 to the scene energy 76, and both the noise energy 74 and the scene energy 76 are in energy 82 that is received by the array of antennas 116 and receivers 118. For example, in one embodiment, the energy 82 from the partial reflector may contain 95% of the scene energy 76 and 5% of the noise energy 74. The balance of the scene energy 76 and noise energy 74 is reflected from, or transmitted through, respectively, partial reflector 80. Other percentages may be used and the coupling device 80, which may be partial reflector 80, may be adapted accordingly.

Figure 1:
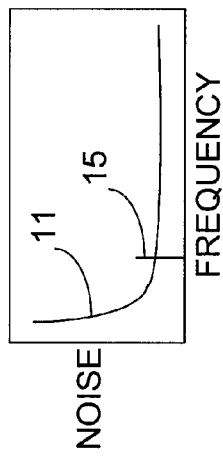
FIG. 1 is a graph representative of 1/f noise in accordance with the prior art.

The noise source 70 is turned on and off, which may be performed by turning on and off the power to the noise source 70, at a fast rate (e.g., on the order of 1 kHz or greater) so that the switching is above the knee frequency 15 in FIG. 1.

Figure 7:
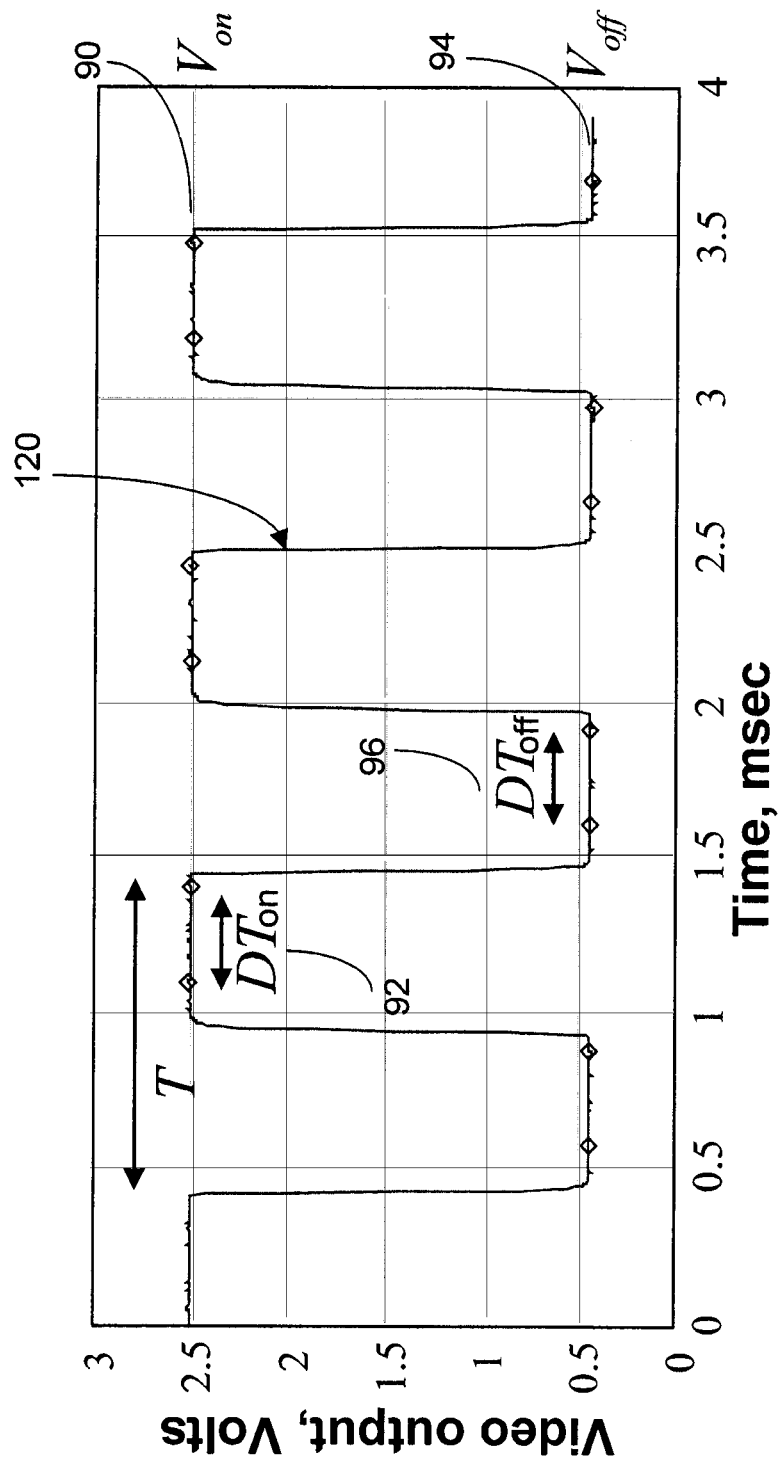
FIG. 7 is a graph of a receiver output in accordance with the present disclosure.

The modulation of the noise source also modulates each receiver 118 output 120 to have a form shown in FIG. 7. The output 120 may alternate between a $V_{on}$ level 90 and a $V_{off}$ level 94, which in one embodiment may be 2.5 volts and 0.5 volts, respectively. When the modulation signal 68 is on, then the output 120 may be at the $V_{on}$ level 90. When the modulation signal 68 is off, the output 120 may be at the $V_{off}$ level 94. A period $T_{on}$ 92, during which the noise source 70 is on, is a duration of time during which the output 120 is near the $V_{on}$ 90 level. A period $T_{off}$ 96, during which the noise source 70 is off, is a duration of time during which the output 120 is near the $V_{off}$ 94 level. The purpose of compensation is to compensate for the drift in the output 120. In this embodiment we assume Ton=Toff, and define a duty cycle factor 0<D<0.5 with respect to the entire switching period T=Ton+Toff so that Ton=Toff=DT.

To perform compensation for drift, each output 120 for a receiver 118 may be first integrated over each $T_{off}$ 96 period to form a set of $V_{off, p}$ voltages and integrated over each $T_{on}$ 92 period to form a set of $V_{on, p}$ voltages, according to the following equations (1), where p is the pth period. This integration may be performed in processor 140 coupled to each output 120. The processor 140 may be an analog or digital signal processor, a computer with memory and a microprocessor, or an ASIC among other possible implementations of processor 140.

$$V'_{off,p} = \frac{1}{DT}\int_{-\frac{1}{2}DT}^{\frac{1}{2}DT} v(t-pT)\,dt,\ V'_{on,p} = \frac{1}{DT}\int_{-\frac{1}{2}DT}^{\frac{1}{2}DT} v\left(t-\left(p+\frac{1}{2}\right)T\right)dt \quad (1)$$

Then the set of $V_{off,p}$ voltages for each respective receiver output 120 are averaged over an averaging interval n, and the set of $V_{on,p}$ voltages for each respective receiver output 120 are averaged over the same averaging interval n, according to the following equations (2), to form a $V_{off,n}$ average output voltage and a $V_{on,n}$ average output voltage for each averaging interval n, where P is the total number of periods within an averaging interval n. A number of averaging intervals n may be used. This technique is commonly referred to as "boxcar" averaging.

$$V_{off,n} = \frac{1}{P}\sum_{p=0}^{P-1} V'_{off,nP+p},\ V_{on,n} = \frac{1}{P}\sum_{p=0}^{P-1} V'_{on,nP+p}. \quad (2)$$

Finally, an estimate of the scene temperature w is formed over the averaging interval n using the following formula (3). Equations 1, 2 and 3 may all be performed using processor 140, which may be one processor or a parallel array of processors.

$$w_n = \frac{V_{off,n}}{V_{on,n} - V_{off,n}} \quad (3)$$

Because both the $V_{on,n}$ and $V_{off,n}$ average output voltages contain the scene energy 76, the scene energy 76 is subtracted out of the denominator. Thus the denominator in equation (3) does not depend on the scene energy, which for a millimeter wave system depends on the scene temperature. Rather the denominator is only an estimate of the noise energy 74 from the noise source 70. However, the numerator in equation (3) depends on only the scene energy 76 but not the noise energy 74, because the numerator only depends on periods when the noise source 70 is off. Further, both the numerator and the denominator in equation (3) are proportional to the gain of the respective antenna 116 and receiver 118 for the output 120. Thus, any fluctuation or drift in the gain of the antenna 116 and/or receiver 118 is canceled out of the estimate of the true scene energy w. It is well known that 1/f noise is due to temporal fluctuations of the receiver gain so this technique cancels out 1/f noise and gain drift. In the case of an imaging array of millimeter wave sensors the scene energy is proportional to the scene temperature.

Figure 8A:
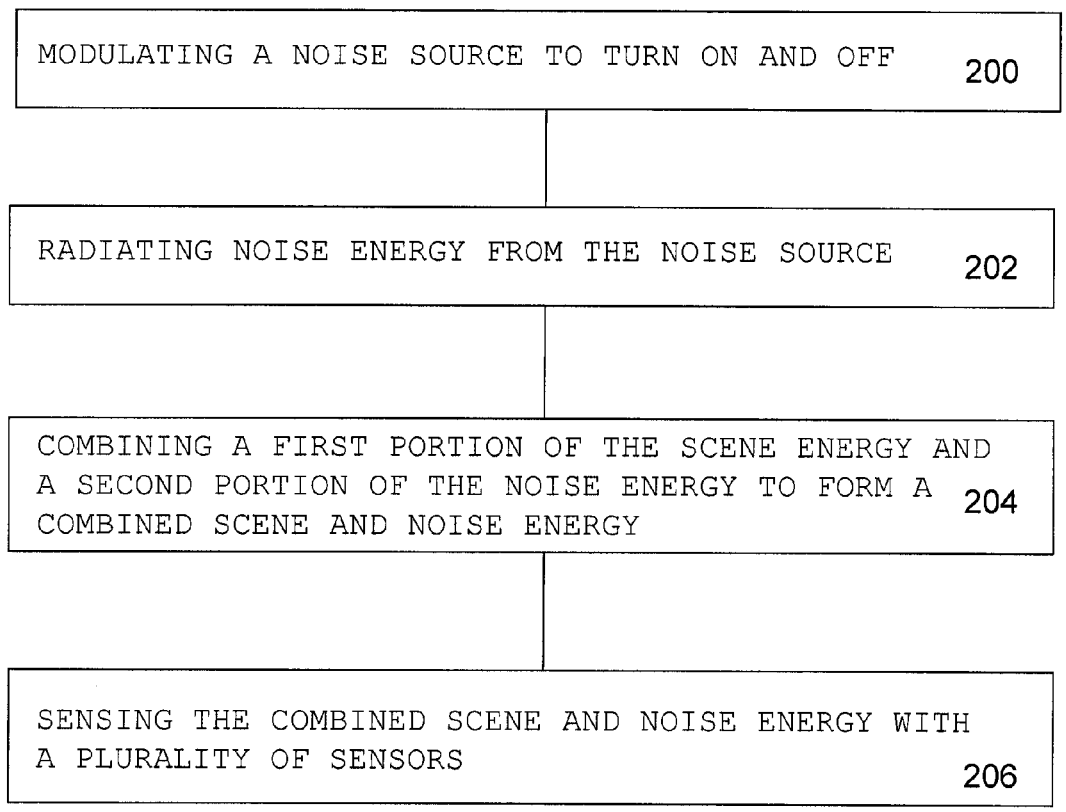

The method described above is further described in the flow diagrams of FIGS. 8A and 8B. In step 200 a noise source is modulating to turn on and off the noise source, and in step 202 noise energy is radiated from the noise source. Then in step 204 a first portion of the scene energy and a second portion of the noise energy are combined to form a combined scene and noise energy. In step 206 the combined scene and noise energy is sensed with a plurality of sensors.

To compensate for drift the method may include step 212 of integrating an output for at least one of the plurality of sensors for a period of time during which the noise source is turned off for a set of noise source off periods to form a set of integrated off outputs, and step 214 of integrating the output for a period of time during which the noise source is turned on for a set of noise source on periods to form a set of integrated on outputs. Then in step 216 the set of integrated off outputs are averaged to form an average off output, and in step 218 the set of integrated on outputs are averaged to form an average on output. Finally, in step 220 the average off output is divided by the average on output minus the average off output.

Figure 9:
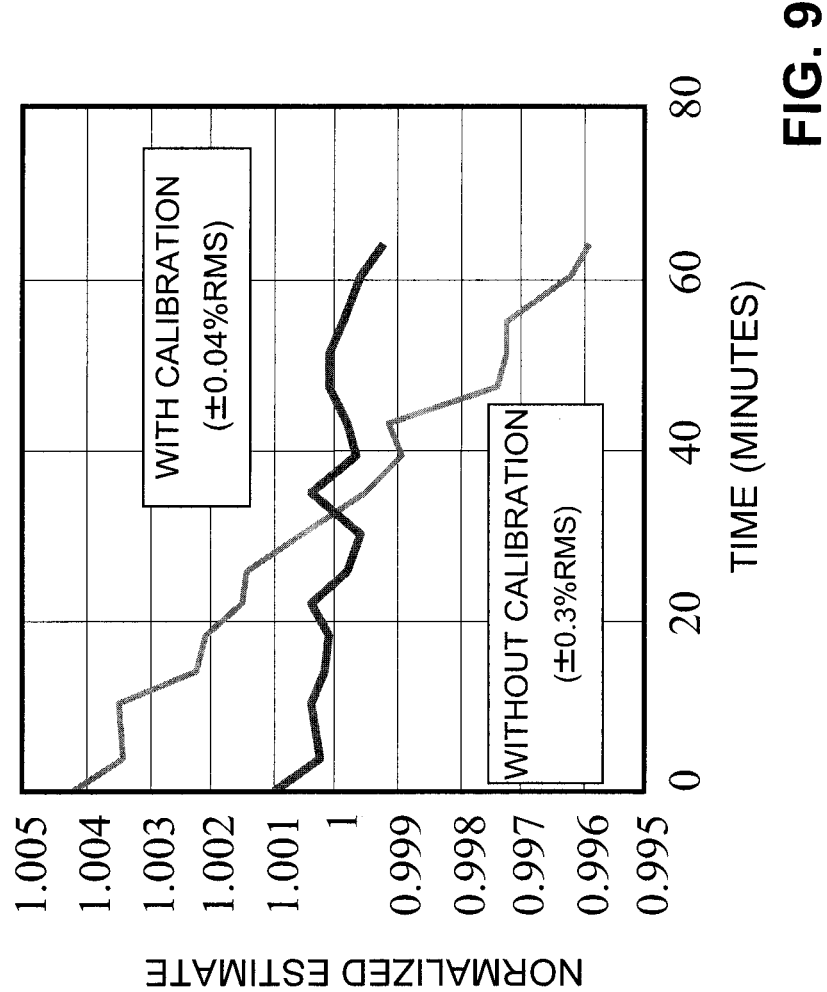
FIG. 9 shows a graph showing drift over time for an uncompensated imaging array compared to an imaging array in accordance with the present disclosure.

FIG. 9 is a graph showing experimental results using the imaging array of the present disclosure compared to an uncompensated imaging array. The measurement results indicate that the scene temperature estimate is stable for over an hour to within about +−0.05%. Also plotted is the drift of a sensor output without compensation, which has an order of magnitude larger change.

This approach also reduces the effect of 1/f noise (short term fluctuations), which improves the sensitivity of the sensor. The sensitivity of a radiometer, such as a millimeter wave sensor, is measured as "noise equivalent temperature difference" (NETD) in units of degrees Kelvin and the lower the NETD, the better. Experiments on an uncompensated sensor measured a NETD equal to 0.43K, while a sensor compensated according to the present disclosure was measured to have a NETD equal to 0.29K.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. An imaging array for sensing scene energy comprising:
    a plurality of sensors;
    a radiative noise source for radiating noise energy, the radiative noise source comprising an amplifier;
    a modulator for turning the radiative noise source on and off; and
    a coupling device for combining a first portion of the scene energy and a second portion of the noise energy to form a combined scene and noise energy for sensing by the plurality of sensors; and
    a processor coupled to at least one output of the plurality of sensors, the processor configured to:
        integrate the output for a period of time during which the noise source is turned off for a set of noise source off periods to form a set of integrated off outputs;
        integrate the output for a period of time during which the noise source is turned on for a set of noise source on periods to form a set of integrated on outputs;
        average the set of integrated off outputs to form an average off output;
        average the set of integrated on outputs to form an average on output; and
        divide the average off output by the average on output minus the average off output.

2. The imaging array of claim 1 wherein each of the plurality of sensors comprises:
    an antenna; and
    a receiver coupled to the antenna.

3. The imaging array of claim 2 wherein the receiver comprises:
    a low noise amplifier; and
    a detector.

4. The imaging array of claim 1 further comprising:
    an antenna coupled to the amplifier.

5. The imaging array of claim 4 wherein the modulator turns power for the amplifier on and off.

6. The imaging array of claim 1 further comprising a lens for focusing the scene energy on the plurality of sensors.

7. The imaging array of claim 1 wherein the coupling device is a partial reflector.

8. The imaging array of claim 1 wherein the plurality of sensors comprise a plurality of millimeter wave sensors.

9. The imaging array of claim 1 wherein the plurality of sensors comprise a horizontal or vertical one dimensional array, or a two dimensional array.

10. The imaging array of claim 1 wherein the modulator turns the radiative noise source on and off at a frequency of 1 kHz or greater.

11. The imaging array of claim 1 wherein the processor comprises an analog signal processor, a digital signal processor, a computer, a microprocessor or an ASIC.

12. A method for compensating an imaging array for sensing scene energy, the method comprising:
    modulating a noise source to turn on and off, the noise source comprising an amplifier;
    radiating noise energy from the noise source;
    combining a first portion of the scene energy and a second portion of the noise energy to form a combined scene and noise energy; and
    sensing the combined scene and noise energy with a plurality of sensors;
    integrating the output for at least one of the plurality of sensors for a period of time during which the noise source is turned off for a set of noise source off periods to form a set of integrated off outputs;
    integrating the output for a period of time during which the noise source is turned on for a set of noise source on periods to form a set of integrated on outputs;
    averaging the set of integrated off outputs to form an average off output;
    averaging the set of integrated on outputs to form an average on output; and
    dividing the average off output by the average on output minus the average off output.

13. The method of claim 12 wherein each of the plurality of sensors comprises:
    an antenna; and
    a receiver coupled to the antenna.

14. The method of claim 12 wherein an antenna is coupled to the amplifier.

15. The method of claim 14 wherein modulating comprises turning power for the amplifier on and off.

16. The method of claim 12 further comprising focusing the scene energy on the imaging array.

17. The method of claim 12 wherein the plurality of sensors comprise a horizontal or vertical one dimensional array, or a two dimensional array.

18. The method of claim 12 wherein modulating the noise source to turn on and off comprises modulating at a frequency of 1 kHz or greater.

19. The method of claim 12 wherein the plurality of sensors comprise a plurality of-millimeter wave sensors.

20. The method of claim 12:
   wherein the steps of integrating, averaging and dividing are performed by a processor; and
   wherein the processor comprises an analog signal processor, a digital signal processor, a computer, a microprocessor or an ASIC.

* * * * *